Oct. 5, 1965 J. K. BARRY ETAL 3,209,425
FASTENER ASSEMBLY
Original Filed May 31, 1962
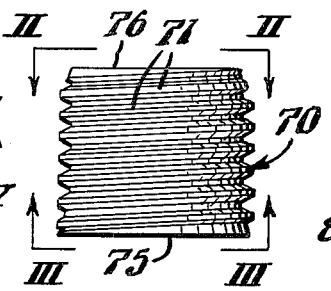
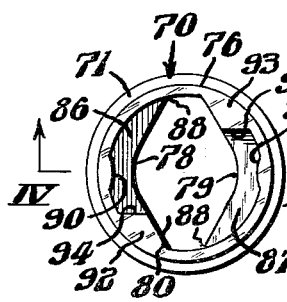
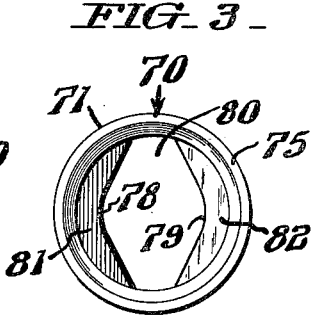
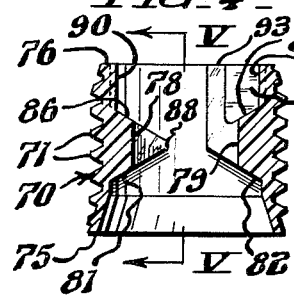
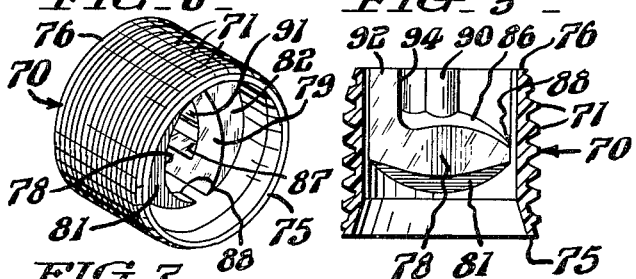
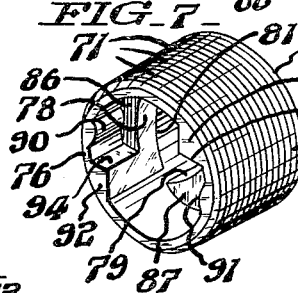
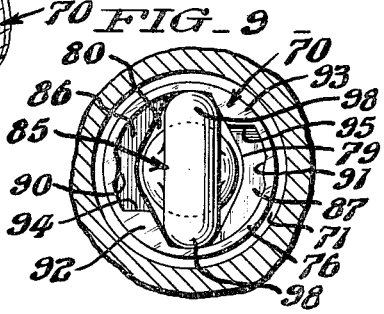
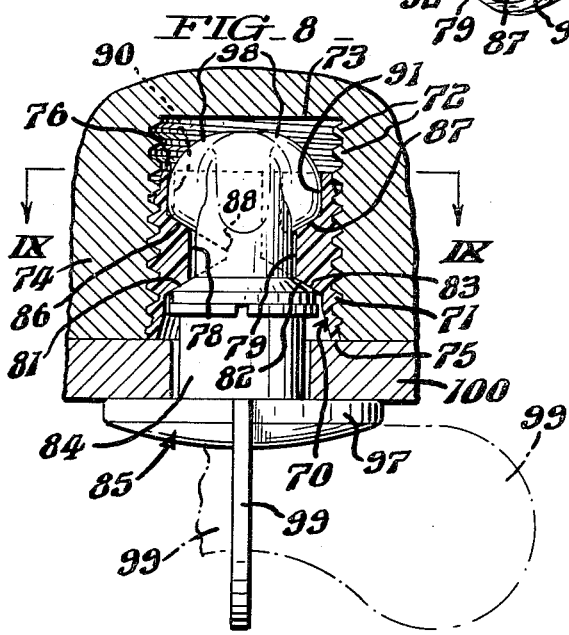
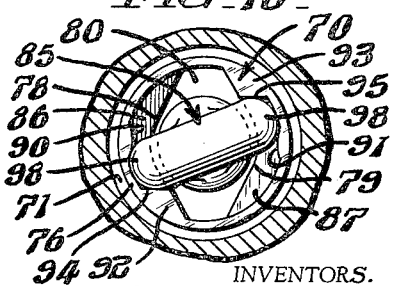
INVENTORS.
John K. Barry &
BY Robert H. Bisbing,
Paul & Paul
ATTORNEYS.

3,209,425
FASTENER ASSEMBLY
John K. Barry, Springfield, and Robert H. Bisbing, Upper Darby, Pa., assignors to South Chester Corporation, Lester, Pa., a corporation of Delaware
Original application May 31, 1962, Ser. No. 200,605. Divided and this application Nov. 6, 1963, Ser. No. 321,793
5 Claims. (Cl. 24—221)

This invention relates to fastener assemblies of the stud and receptacle type. More particularly, this invention relates to fastener assemblies having receptacles for receiving, pulling up and retaining in locked position the studs of fasteners adapted to securing sheets, panels or the like, of relatively rigid material, to each other or to a substantially flat retaining surface. This application is a division of the copending application of Robert H. Bisbing and John K. Barry, Serial No. 200,605, filed May 31, 1962, now abandoned.

It is an object of this invention to provide a fastener assembly of the stud and receptacle type which is adapted to easy and rapid installation in sheet metal panels and the like, whereby said panels are secured together under tension.

It is another object of this invention to provide a fastener assembly having a receptacle adapted for use with the studs of the one-quarter turn fasteners which may be installed in a single hole, usually but not necessarily blind, in comparatively thick castings and other similar objects.

It is another object of this invention to provide a fastener assembly having a receptacle adapted for use with the studs of one-quarter turn fasteners which may be installed entirely from one side of any retaining member, the opposite side of which is relatively inaccessible, thereby providing comparative ease and rapidity of installation in a number of situations which have heretofore presented difficult problems of installation because of the need to approach said retaining member from the relatively inaccessible side in order to clip, rivet, weld or otherwise attach a fastener receptacle thereto in the usual manner.

It is another object of this invention to provide a receptacle adapted for use with the studs of one-quarter turn fasteners which is adjustable to compensate for variations in the material thickness of members to be fastened together so that studs of the same dimension may be used to fasten said members of variable thickness with uniform fastening tension.

It is another object of this invention to provide a stud and receptacle fastener assembly which provides the rigid tensile characteristics of a nut and bolt and which yet provides the fast engagement and release characteristics of a one-quarter turn fastener.

It is another object of this invention to provide a stud and receptacle fastener which is adapted to adjustment to variations in the thickness of the members to be fastened thereby, yet which eliminates the use of built-in springs of the kind heretofore used in fasteners adapted to hold together panels and the like under spring tension.

It is another object of this invention to provide an improved receptacle for a fastener assembly which is both durable and strong, yet which is also resilient and moderately deformable.

Other objects and attendant advantages of the invention will become apparent hereinafter and from the drawings, wherein:

FIG. 1 is a view in side elevation of a stud receptacle as provided in accordance with this invention;

FIG. 2 is a view in end elevation of the stud receptacle taken as indicated by the lines and arrows II—II in FIG. 1;

FIG. 3 is a view in end elevation of the stud receptacle taken as indicated by the lines and arrows III—III in FIG. 1;

FIG. 4 is a view in cross section of the stud receptacle taken as indicated by the lines and arrows IV—IV in FIG. 2;

FIG. 5 is a view in cross section of the stud receptacle taken as indicated by the lines and arrows V—V in FIG. 4;

FIG. 6 is a view in perspective of the stud receptacle showing details of the front end thereof;

FIG. 7 is a view in perspective of the stud receptacle showing details of the rear end thereof;

FIG. 8 is a view partly in section and partly in elevation showing the stud and fastener assembly installed in members to be fastened thereby;

FIG. 9 is a sectional view taken as indicated by the lines and arrows IX—IX of FIG. 8 showing the stud positioned as indicated by the dot-dash lines of FIG. 8; and FIG. 10 is a view similar to FIG. 9 showing the stud positioned as indicated by the solid lines of FIG. 8.

The following description is directed to the specific form of the invention illustrated in the drawings and is not intended to be addressed to the scope of the invention itself which may be practiced in a wide variety of forms and arrangements.

Adverting to the specific form of the invention illustrated in the drawings, the fastener assembly as provided in accordance with this invention has a receptacle 70 made of plastic, which receptacle has formed on the exterior wall thereof threads 71 adapted to engage threads 72 formed in the wall of a bore 73 provided in a casting or similar member 74. As may best be seen in FIGS. 6 and 7, the receptacle 70 is tubular or generally cylindrical in shape and has a front end 75 and a rear end 76. As may be seen in FIGS. 2 and 3, the receptacle 70 is open at opposite ends and has formed interiorly thereof opposing ridges 78 and 79 extending from opposite sides of the wall of the receptacle. The shape of the ridges 78 and 79 forms an elongate opening 80 in the receptacle. As may best be seen in FIGS. 3 and 4, seating surfaces 81 and 82, adapted to seat flange 83 formed on shaft 84 of a plastic stud 85, are formed on the sides of the ridges 78 and 79 facing the front end 75 of the receptacle 70. As may be seen in FIG 4, the seating surfaces 81 and 82 slant inwardly of the receptacle, that is, toward the rearward end thereof, from the wall of the receptacle to the inward edges of the respective ridges 78 and 79. On the opposite side of the ridges 81 and 82 facing the rear end of the receptacle 70, are cam surfaces 86 and 87 which surfaces likewise slant inwardly of the receptacle, that is, toward the front end thereof, from the wall of the receptacle to the inward edges of the respective ridges 78 and 79. The cam surfaces 86 and 87, moreover, slope outwardly toward the rear of the receptacle 70 from the vertexes 88 thereof to a point adjacent a pair of ribs 90 and 91 formed in the wall of the receptacle 70 and extending longitudinally from the respective surfaces 86 and 87 to the rear end 76 of the receptacle. Likewise formed in the wall of the receptacle 70 and extending longitudinally from the ridges 78 and 79 to the rear end 76 of the receptacle are a pair of stop projections 92 and 93 having stop surfaces 94 and 95 which are spaced from the ribs 90 and 91 respectively. Between the ribs 90 and 91 and the stop projections 92 and 93, the cam surfaces 86 and 87 level off to become substantially parallel with the ends of the receptacle.

As may be seen in FIGS. 8, 9 and 10, in addition to the flange 83 and the shaft 84, the stud 85 further comprises a head portion 97 at one end of the shaft 84 and diametrically opposed lug portions 98 at the opposite end thereof. Wings 99 are further provided on the head 97 of the stud to facilitate the turning of the stud in its receptacle. In FIG. 8 the stud 85 is shown in solid lines locked into position in the receptacle 70 thereby securing a panel 100 to the casting 74.

In the practice of the invention, the plastic receptacle 70 is threaded into the bore 73 provided for its reception in the casting 74 so that the rear end 76 of the receptacle faces inwardly of the bore and the front end 75 of the receptacle faces outwardly of the bore. The receptacle 70 is then adjusted to approximately the desired depth in the bore substantially as shown in FIG. 8. The stud 85 is then passed through the panel 100 and guided through the front end 75 of the receptacle 70 with the lugs 98 of the stud aligned axially along the longest dimension of the opening 80 so that the lugs 98 of the stud pass the ridges 78 and 79 and so that the flange 83 of the stud 85 seats upon the seating surfaces 81 and 82 of the receptacle. Thereafter the stud 85 is rotated in a clockwise direction, as seen in FIG. 8, through approximately a one-quarter turn from the position shown in dot-dash lines in FIG. 8 to the position shown in solid lines. As the stud 85 begins to rotate the lugs 98 thereof engage the cam surfaces 86 and 87 at the points 88 and slide along the aforesaid surfaces past the ribs 90 and 91 to become lodged in the spaces between the ribs 90 and 91 and the stop surfaces 94 and 95 respectively. The sloping cam surfaces 86 and 87 pull the stud inwardly of the receptacle to bring the head 97 thereof tightly against the panel 100, thereby securing it firmly in place. Since the receptacle 70 is made entirely of a resilient and deformable material, the ribs 90 and 91 are deformed sufficiently by the pressure applied thereto by the lugs 98, as a result of the torque applied to the head of the stud 85 in the rotation thereof, to permit the lugs 98 to pass the aforesaid ribs and abut the stop surfaces 94 and 95. After the lugs 98 of the stud have passed the ribs 90 and 91 the aforesaid ribs owing to their resilient character again assume their normal dimension and configuration and keep the lugs 98 locked into position against the surfaces 94 and 95. In FIG. 9, the lugs 98 of the stud 85 are shown in the normal position in the receptacle 70 at the point of insertion or withdrawal of the stud into the receptacle. In FIG. 10, the lugs 98 are shown abutting the stop surfaces 94 and 95 of the stop projections 92 and 93, and locked into position thereagainst by the ribs 90 and 91 after the stud has been rotated through approximately a one-quarter turn within the receptacle.

When it is desired to release the panel 100 from the casting 74, the stud 85 is first rotated in the opposite direction to cause the receptacle to move upward toward the open end of the bore 73, thereby releasing the clamping pressure between the panel 100 and the casting 74, and then the stud 85 is additionally rotated through approximately a one-quarter turn in a counterclockwise direction in the receptacle to cause the lugs 98 to pass the ribs 90 and 91 along the sloping cam surfaces 86 and 87, past the ends 88 thereof, after which the stud 85 may be withdrawn from the receptacle.

As the lugs 98 pass the ribs 90 and 91 the pressure applied causes a slight deformation of the receptacle 70 itself thereby creating additional rotational "drag" between the receptacle and the threaded bore 73. As a consequence, rotation of the receptacle while the stud is passing into or out of the locked position is thereby prevented.

It will be apparent that it is an important advantage of the fastener assembly as provided in accordance with this invention that, by means of the threaded receptacle, adjustment can be made to compensate for variations in the thickness of materials forming the fastened members, as a consequence of which a single size stud can be used to fasten such members with uniform tension.

Another important advantage of the invention lies in the manner of construction of the fastener assembly wherein the use of built-in springs and the like for retaining members by spring-tension only, is entirely eliminated.

Still another important feature of the invention resides in the provision of a receptacle which can be installed from the front or accessible side of the member when it is not possible to get behind the member to install a receptacle in the rear surface thereof.

It will be appreciated and it is also an important and advantageous feature of the invention that a fastener assembly is provided having resilient and deformable ribs formed therein which are capable of resilient compressive deformation to allow passage of similarly resilient lugs, or even of non-deformable lugs if desired, when the stud is rotated into or out of the locked position in the receptacle. This feature of the invention thereby eliminates the need for any axial drop-back of the stud in going into the locked position; the cam surfaces of the receptacle need only to rise and level off. It will be appreciated that the plane surfaces comprised by the cam surfaces of the specific embodiment illustrated are illustrative only of a general cam surface which rises and levels off.

What is claimed is:

1. In a fastener assembly for securing together a plurality of relatively rigid members, and including a one-quarter turn stud element, a generally cylindrical open ended receptacle formed of resilient, deformable material, said receptacle having threads formed on the exterior surface thereof and adapted for axial movement in a correspondingly threaded bore in one of said members, said receptacle having formed therein intermediate the ends thereof, at least one seating surface arranged to seat said stud in said receptacle, a pair of sloping cam surfaces arranged to engage said stud when seated in said receptacle, at least one stop surface arranged to limit the rotation of said stud in said receptacle, and at least one deformable rib spaced from said stop surface and arranged to lock said stud in position in said receptacle.

2. In a fastener assembly including a one-quarter turn fastener stud having projecting lugs on the shaft thereof, a deformable receptacle for use with said stud comprising an open ended tubular wall having a threaded exterior surface adapted to engage the threads of a correspondingly threaded mating hole, a pair of opposing ridges integrally formed circumferentially on the interior surface of said wall intermediate the ends thereof, said ridges having formed on one side thereof a pair of opposing seating surfaces arranged to seat said stud in said receptacle and a pair of cam surfaces formed on the opposite side thereof arranged to engage said lugs of said stud, a pair of opposing deformable ribs integrally formed with said wall on the interior surface thereof adjacent said cam surfaces, and a pair of opposing stop projections integrally formed with said wall on the interior surface thereof and spaced apart from said ribs, said stop projections being arranged to limit the rotation of said stud in said receptacle.

3. The receptacle defined in claim 2 wherein said ribs extend longitudinally of said receptacle from said cam surfaces to an open end of said receptacle.

4. The receptacle defined in claim 3 wherein said stop projections are at the ends of said cam surfaces and extend substantially parallel to said ribs to said open end of said receptacle.

5. The receptacle defined in claim 4 wherein between the rib and the stop projection, on each side of the receptacle, the cam surface is substantially normal to the principal, longitudinally extending axis of the receptacle.

References Cited by the Examiner

UNITED STATES PATENTS

| | | |
|---|---|---|
| 2,067,039 | 1/37 | Auer. |
| 2,325,295 | 7/43 | Zaleske _____ 24—221.2 |
| 2,514,113 | 7/50 | Zahodiakin _____ 24—221.2 |
| 2,691,199 | 10/54 | Schlueter _____ 24—221.2 |
| 3,029,486 | 4/62 | Raymond _____ 24—213 X |

DONLEY J. STOCKING, *Primary Examiner.*